United States Patent
Seetharamaiah

(10) Patent No.: US 10,148,682 B2
(45) Date of Patent: Dec. 4, 2018

(54) SECURITY OF VDI CLONES

(71) Applicant: McAfee, Inc., Santa Clara, CA (US)

(72) Inventor: Sriranga Seetharamaiah, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 58 days.

(21) Appl. No.: 14/738,608

(22) Filed: Jun. 12, 2015

(65) Prior Publication Data
US 2016/0366173 A1    Dec. 15, 2016

(51) Int. Cl.
*H04L 29/06* (2006.01)
*G06F 21/56* (2013.01)

(52) U.S. Cl.
CPC ........ *H04L 63/1433* (2013.01); *G06F 21/562* (2013.01); *G06F 21/567* (2013.01); *H04L 63/10* (2013.01); *H04L 63/145* (2013.01); *H04L 63/1416* (2013.01)

(58) Field of Classification Search
CPC ..... H04W 12/00; H04W 12/02; H04W 12/06; H04W 12/08; H04L 63/00; H04L 63/04; H04L 63/0414; H04L 63/08; H04L 63/0876; H04L 63/12; H04L 63/126; H04L 63/1433; H04L 63/10; H04L 63/1416; H04L 63/145; G06F 21/562; G06F 21/567
See application file for complete search history.

(56) References Cited

U.S. PATENT DOCUMENTS

| | | | |
|---|---|---|---|
| 7,107,618 B1 * | 9/2006 | Gordon | G06F 21/56 709/206 |
| 8,584,240 B1 * | 11/2013 | Yang | G06F 21/552 713/188 |
| 9,223,980 B1 * | 12/2015 | Bao | G06F 21/561 |
| 2008/0263658 A1 * | 10/2008 | Michael | G06F 21/562 726/22 |
| 2010/0250400 A1 * | 9/2010 | Fernandez Gutierrez | G06Q 30/0603 705/26.1 |
| 2012/0066762 A1 | 3/2012 | Todorovic | |
| 2014/0019962 A1 | 1/2014 | Litty et al. | |
| 2015/0127768 A1 | 5/2015 | Zamir et al. | |

FOREIGN PATENT DOCUMENTS

WO    2014117533 A1    8/2014

OTHER PUBLICATIONS

International Search Report and Written Opinion received for PCT Patent Application No. PCT/US2016/032105, dated Aug. 19, 2016, 5 pages.

* cited by examiner

*Primary Examiner* — Ayoub Alata
(74) *Attorney, Agent, or Firm* — Hanley, Flight & Zimmerman, LLC

(57) ABSTRACT

Utilizing a virtual desktop interface, including receiving, from a server, a clone image comprising an instance of an operating system and an application executing on the server, and a copy of scan results, identify initiation of the application using the clone image, in response to identifying initiation of the application, determine that the copy of scan results includes scan results of the application, and in response to determining the copy of scan results includes scan results of the application, executing the application without any further scan of the application.

20 Claims, 4 Drawing Sheets

SECURITY OF VDI CLONES

TECHNICAL FIELD

Embodiments described herein generally relate to virtual desktop infrastructure clones, and more particularly to providing security in virtual desktop interface clones.

BACKGROUND ART

Desktop virtualization implementations provide a desktop environment management system. A virtual desktop infrastructure (VDI) provides a desktop-oriented solution to provide user environments on individual client devices.

In a typical VDI solution, a base image with the required operating system and necessary applications is created. These applications may include antivirus solutions, such as McAfee antivirus solutions. Clone images of the base image are generated and distributed among host clients across a network, and each clone image is responsible for scanning its own applications.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily referring to all the same embodiment.

As used herein, the term "computer system" can refer to a single computer or a plurality of computers working together to perform the function described as being performed on or by a computer system.

As used herein, the term "server" can refer to any computer system that is capable of communicating with and hosting an operating system and associating applications for another computer system across any type of network.

As used herein, the term "client" can refer to any computer system that is capable of executing a VDI provided by a server.

In one or more embodiments, a technique for providing VDI security is disclosed and may include deploying a clone image to a host client that includes an instance of an operating system and associated applications, along with scan results for the clone image. Further, in one or more embodiments, a server may manage scan results for a single base image and deploy copies of the scan results along with each clone image in the network. When new scan results are generated by a single instance, for example when the scanning technology has been updated, the updated scan results may be deployed throughout the network to replace the original scan results. In one or more embodiments, when an application is initiated by one of the host clients, the host client identifies the scan results that have been received from the server and, in response, allows execution of the application without scanning the application. Thus, in one or more embodiments, the disclosed techniques may reduce the time and resources required to execute clone images on host clients without sacrificing security.

Figure 1:
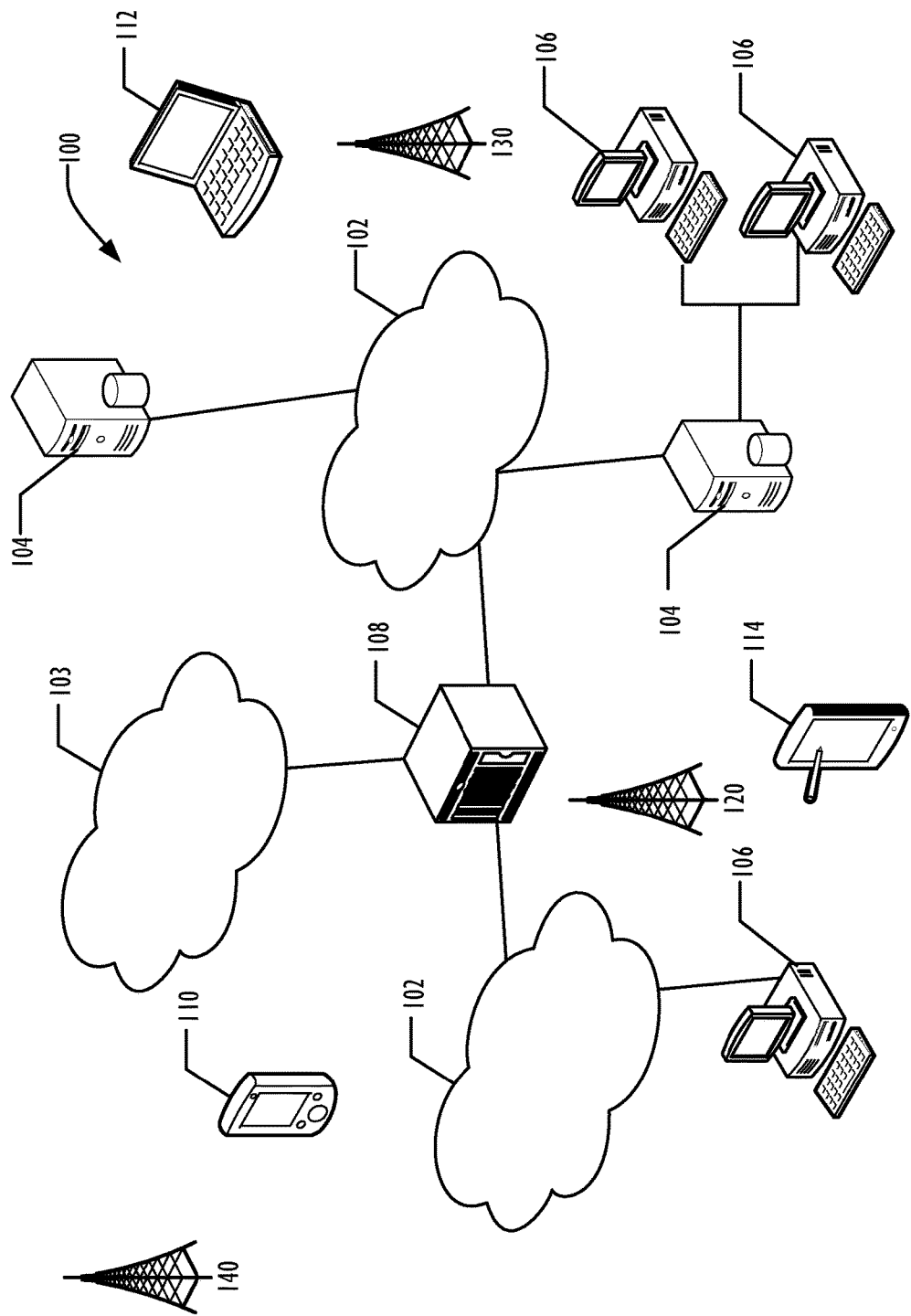
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

In one or more embodiments, one or more of the devices connected across network 102 may support a VDI. Devices that support a virtual desktop infrastructure may include a server 104 and various end user devices, such as computers 106. A virtual desktop infrastructure may include the server 104 hosting a desktop operating system within a virtual machine (VM), and providing access to the virtual machines to the host clients 106.

In one or more embodiments, each VM includes an instance of an operating system along with applications to be used by users at each client. The applications may include user applications, as well as security applications, such as a virus scanner, malware identifier, or other security software. In one or more embodiments, the server generates clone images to include the operating system and applications and deploy the clone images to the VMs to be accessed by the clients. As part of generating the clone images, or anytime during hosting the base image, the server may provide scan results as part of the clone images. The clone images may be configured such that when a user initiates an application, the clone image identifies the scan results and, in response, launches the application without performing a scan.

Figure 2:
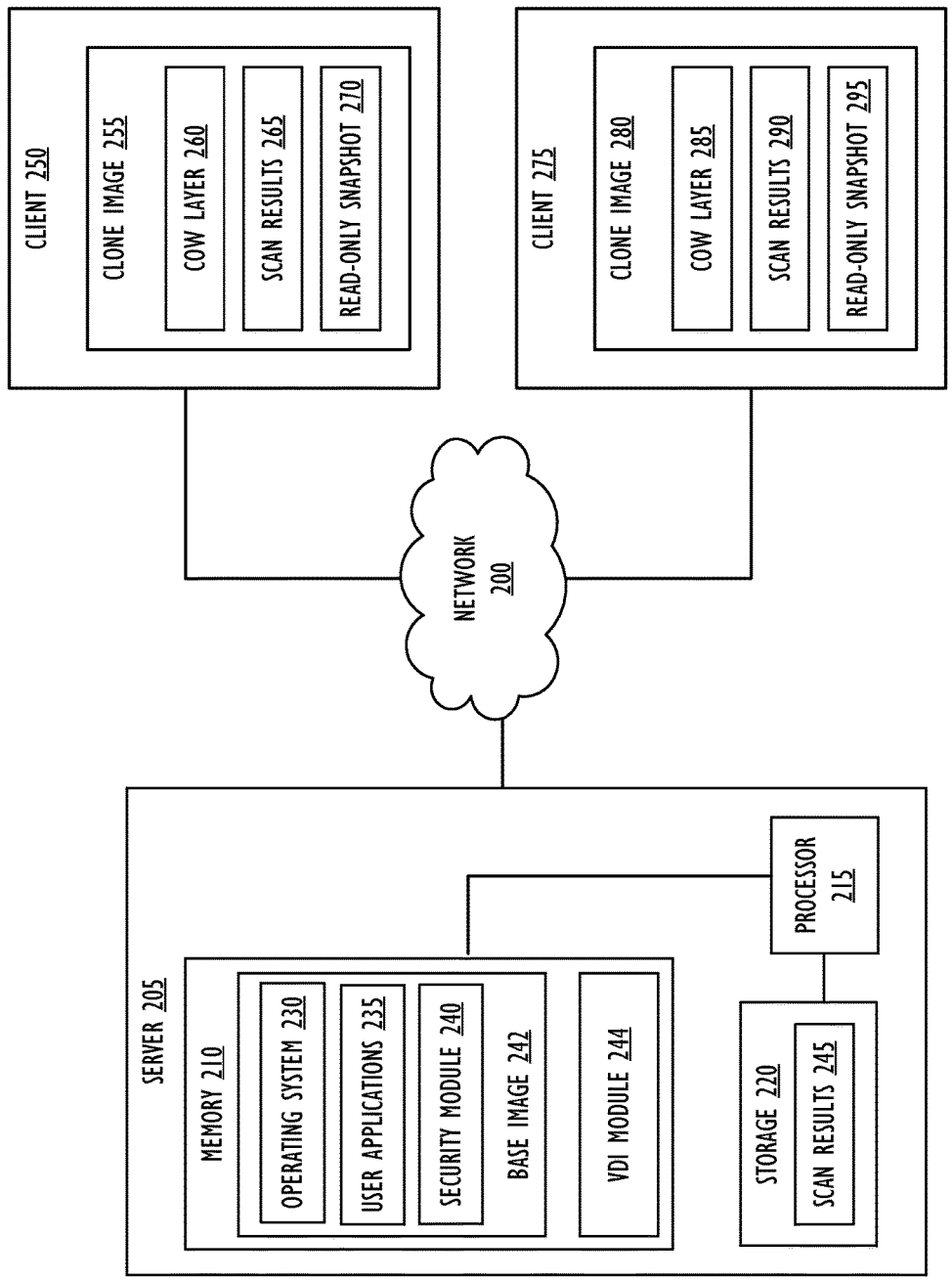
FIG. 2 is a diagram illustrating a system for providing security in a VDI according to one or more embodiments.

FIG. 2 is a diagram illustrating a system for providing security in VDI clone images. FIG. 2 includes three devices, including Server 205, and Client 250, and Client 275, connected across Network 200. Network 200 may be any type of computer network, such as a LAN or a corporate network. For example, Network 200 may include a subset of the devices included in larger network 102 or 103. Network 200 may be a network enclave within a larger general network. It should be understood that the components are depicted in FIG. 2 as an example embodiment, and some or all of the various components may be located, for example, within a single server, multiple servers, network storage, or other network devices.

Server 205 includes a processor core 215. Processor core 215 may be the core for any type of processor, such as a micro-processor, an embedded processor, a digital signal processor (DSP), a network processor, or other device to execute code. Although only one processor core is illustrated in each trusted device in FIG. 2, a processing element may alternatively include more than one of the processor core 215 illustrated in FIG. 2. Processor core 215 may each be a single-threaded core or, for at least one embodiment, processor core 215 may be multithreaded in that it may include more than one hardware thread context (or "logical processor") per core.

Server 205 also includes a memory coupled to the processor. Memory 210 may be any of a wide variety of memories (including various layers of memory hierarchy) as are known or otherwise available to those of skill in the art. Program code, or instructions, such as the operating system 230, the user applications 235, security module 240, and VDI module 244, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 215 follow a program sequence of instructions indicated by the code. In this manner, processor core 215 is transformed during execution of the code.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches.

Through the VDI module 244, the server 205 may provide the operating system 230, user applications 235, and security module 240 to client 250 and client 275. The operating system 230 manages execution of the various applications. User applications 235 may be any applications that allow a user to perform some actions through the computer systems. Security module 240 may be any security program that scans the user applications. For example, security module 240 may include an antivirus or other security program that is configured to scan a system for malicious content. Security module 240 may store the results of a scan as scan results 245 in storage 220.

In one or more embodiments, the applications may be provided to clients 250 and 275 in the form of virtual machines. Virtual machines can include their own processors, memory, storage, or other components typically found in a computer system. In one or more embodiments, the server 205, or other network device may include hypervisors that are configured to create and manage the virtual machines.

In one or more embodiments, VDI module 244 manages a base image 242 that includes the operating system 230, user applications 235, security module 240, as well as scan results 245, and provides them as clone images 255 and 280. Clone images may be provided to the clients in the form of a virtual machine on the server 205 or other network device. In one or more embodiments, the clone images 255 and 280 include read-only snapshots 270 and 295, copies of the scan results 265 and 290, and copy-on-write (COW) layers 260 and 285. Thus, for every deployment of a clone image, a new snapshot layer is created and each clone image includes a read-only layer, a COW layer, and a copy of the scan results. The clone images may be provisioned by the server and accessed by the client devices 250 and 275, for example, through the use of a virtual machine on the server. In one or more embodiments, the scan results may be included in a cache snapshot layer. The read-only snapshots 270 and 295 include an instance of the operating system 230, user applications 235, and security module 240, and any other applications to be used by the end user. Read-only snapshot 270 and read-only snapshot 295 are generated from the same components hosted in server 205, and thus are identical when deployed. Because they are read-only, users at client 250 and client 275 are unable to modify the files, they remain identical even while in use. Changes generated by a user are stored as COW layers 260 and 285, which are generated as part of the clone images 255 and 280. Although the clone image 255 and 280 are depicted as part of clients 250 and 275, in one or more embodiments, each of the base image 242 and clone images 255 and 280 may be stored on storage 220, or in another network storage not shown. That is, in one or more embodiments, the clone images 255 and 280 may be hosted on server 205 or network storage, and accessed via client 250 and client 275.

Typically, when an application is initialized, the application will have to be scanned for malicious content by security module 240 before it is loaded. In one or more embodiments, before the clone images 255 and 280 are provisioned, security module 240 scans the base image at the server and stores the results as scan results 245. Thus, whereas each client would typically separately have to scan the various applications, in one or more embodiments, the files only need to be scanned once in the base image, saving a significant amount of time and resources throughout the network. A copy of the scan results is included as part of the clone images as scan results 265 and scan results 290, and may be included as part of a cache of the base image. In one or more embodiments, the scan results may alternatively be included as part of COW layers 260 and 285. Thus, when a user at client 250, for example, initiates an application in read-only snapshot 270, the client 250 identifies the scan results 265 and, in response, determines that a scan is not necessary. Accordingly, the applications may be loaded without the security module 240 scanning the application. Loading the application without scanning the applications by client cuts down on processing time because each program does not have to be scanned at the host device, as it has already been scanned on the server.

In one or more embodiments, scan results may be updated occasionally. For example, the security module 240 may re-scan the base image when the clients are offline, or periodically, or when the security module 240 has been updated to identify new malicious content. The updated scan results are then used in new clone images, or propagated through the current clone images.

In the case of non-persistent provisioning of the clone image, for example, when a user at client 250 logs off the client, the COW layer 260 and the scan results 265 are erased. Thus, updated scan results are provided when a user logs into a client again. In the case of persistent provisioning of the clone image, the COW layer and the scan results may be retained in the client device. In this scenario, the COW layer and scan results may be updated whenever a new scan of the base image is completed.

Although not illustrated, Client 250 and Client 275 may also include a memory or storage and a processor. In one or more embodiments, the memory and processor of Client 250 and Client 275 allow the devices to execute clone image 255 and clone image 280, respectively. In one or more embodiments, clients 250 and 275 may also include I/O devices, such as display devices and user input devices that allow users of the clients to utilize the clone images.

Figure 3:
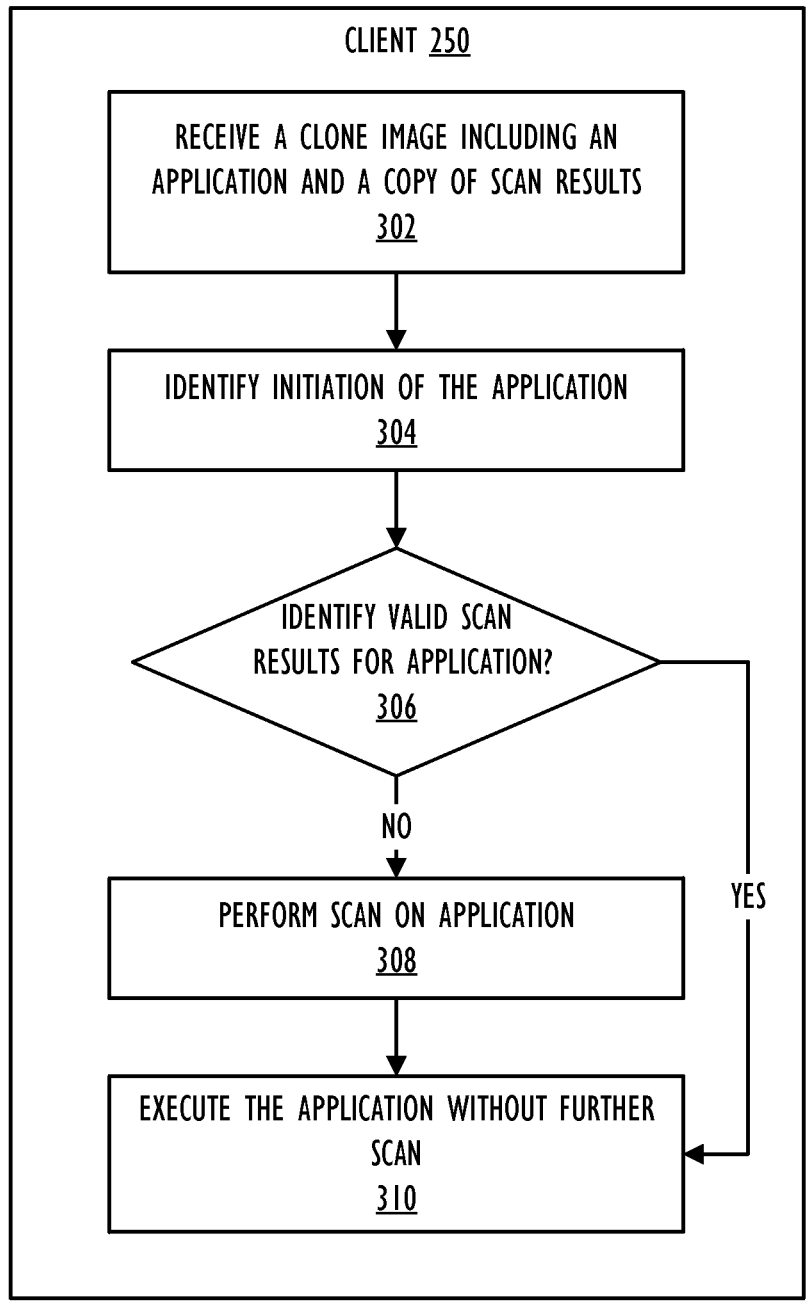
FIG. 3 is a flow diagram illustrating a technique for executing an application within a VDI, according to one or more embodiments.

FIG. 3 is a flow diagram illustrating a technique for executing an application within a VDI, according to one or more embodiments. FIG. 3 illustrates a method at client 250 in a network running a clone image 255. The method begins at 302, and a clone image is received. The clone image may include an application and a copy of scan results. As depicted in FIG. 2, the clone image may include the application has part of the read-only snapshot 270 that includes an instance of the operating system and various applications hosted by a server 205. The copy of the scan results may be received as part of the COW layer 260 of the clone image 255, or may be a new independent layer, as shown as scan results 265.

At 304, the client 250 identifies initiation of an application on the client. For example, a user may initiate an application, or an application may otherwise be loaded. As part of the loading process, or before loading the application, at 306, a determination is made regarding whether valid scan results for the application have been identified. Identifying that scan results for the application exist may indicate that the application has already been scanned by the security module 240, and another scan is not necessary. In one or more embodiments, determining whether valid scan results exist may include determining whether the scan results have expired, or are no longer valid for any other reason. If a determination is made at 306 that the scan results are not valid, then the method continues at 308, and the application is scanned. In one or more embodiments, the instance of the security module 240 in the read-only snapshot 270 may scan the application. Thus, in one or more embodiments, scanning the image could be accomplished on any virtual machine from one of the available clones. For example, results from a new scan that occurs at client 275 may be pushed to server 205 and/or client 250. The scan may need to only occur once for all of the clone images in the system until those scan results expire. In addition, the instance of the security module 240 in the read-only snapshot 270 may replace the scan results 265 with the updated scan results. Further, in one or more embodiments, the updated scan results may be pushed to the clone images for all other clients in the system, either upon a user logging into a client device, or upon a refresh operation for a non-persistent clone instance. In one or more embodiments, a client may push updated scan results to other clients in the system, or may transmit updated scan results to the server to be propagated to other clients in the system. After 308, and in the event that valid scan results are identified at 308, the method continues at 310, and the application is allowed to execute without further scan.

Figure 4:
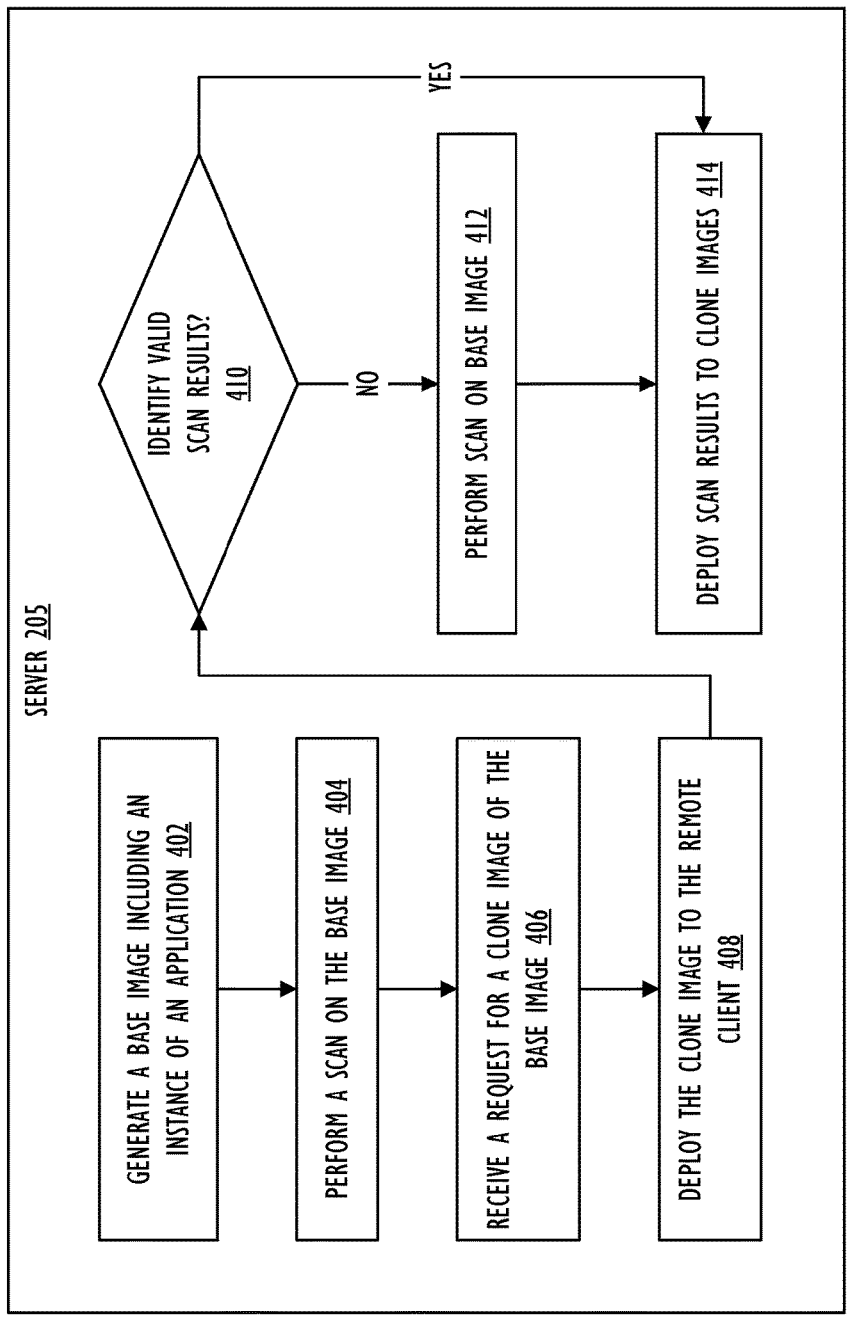
FIG. 4 is a flow diagram illustrating a technique for providing a VDI according to one or more embodiments

FIG. 4 is a flow diagram illustrating a technique for providing a VDI according to one or more embodiments. FIG. 4 illustrates a server 205 generating and deploying clone images for clients. The method starts at 402 and the server 205 generates a base image including an instance of an application. For example, the VDI module 244 of the server 205 may generate the base image.

The method continues at 404, and the security module 240 performs a scan on the base image. As described above, the security module 240 may include an antivirus program, an anti-malware program, or any other security program that scans for malicious content. In one or more embodiments, the security module 240 stores the scan results 245, and a copy of the scan results 245 is included in the base image.

The method continues at 406, and a request for a clone image of the base image is received. In one or more embodiments, a request may be received, for example, as the result of a user login to a client device, such as client 250 or client 275. At 408, the clone image is deployed to the remote client. The clone image may be deployed, for example, in the form of a virtual machine that is hosted by the server.

At 410, a determination is made regarding whether the scan results 245 are valid. As long as scan results are still valid at 410, then the same scan results are deployed to clone images at 414. Scan results 245 may become invalid, for example, after a predetermined period of time, or if the security module itself has been updated with new virus or other malware definitions, or for any other reason that may be indicated by the scan results.

If at 410 it is determined that the scan results are no longer valid, then at 412, the security module 412 performs a new scan on the base image, and at 414, the server stores the updated scan results and deploys the updated scan results to the clone images. The server may deploy the updated scan results, for example, upon a user requesting a new clone image at a client, or upon a user performing a refresh operation at a client. In addition, the server may push updated scan results during a client session.

It is to be understood that the various components of the flowchart described above, could occur in a different order or even concurrently. It should also be understood that various embodiments of the inventions may include all or just some of the components described above. Thus, the flowcharts are provided for better understanding of the embodiments, but the specific ordering of the components of the flow chart are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed by a processor cause a machine to: receive, from a server, a clone image comprising an instance of an operating system and an application executing on the server, and a copy of scan results; identify initiation of the application using the clone image; in response to identifying initiation of the application, determine that the copy of scan results includes scan results of the application; and in response to determining the copy of scan results includes scan results of the application, executing the application without any further scan of the application.

In Example 2, the subject matter of Example 1 can optionally include instructions that further cause a machine to determine that the scan results have expired; and in response to determining that the scan results have expired: scan the application; and update the scan results to obtain updated scan results.

In Example 3, the subject matter of Example 2 can optionally include instructions that when executed cause a machine to deploy the updated scan results to remote clients executing additional clone images and connected to the local client device across a network.

In Example 4, the subject matter of Example 1 can optionally include the clone image comprises a read-only layer and a cache snapshot layer, wherein the read-only layer comprises the instance of the operating system and the application, and wherein the cache snapshot layer includes the copy of the scan results.

In Example 5, the subject matter of Example 3 can optionally include instructions that further cause a machine to the clone image further comprises a copy-on-write layer configured to store modifications to the clone image by a local client device.

Example 6 includes a system for utilizing a virtual desktop interface, including one or more processors; and a memory, coupled to the one or more processors, on which instructions are stored which, when executed by the one or more processors cause the one or more processors to receive, from a server, a clone image comprising an instance of an operating system and an application executing on the server, and a copy of scan results; identify initiation of the application using the clone image; in response to identifying initiation of the application, determine that the copy of scan results includes scan results of the application; and in response to determining the copy of scan results includes scan results of the application, executing the application without any further scan of the application.

In Example 7, the subject matter of Example 6 can optionally include instructions that when executed cause the one or more processors to determine that the scan results have expired; and in response to determining that the scan results have expired: scan the application, and update the scan results to obtain updated scan results.

In Example 8 the Example of claim 7 can optionally include instructions that when executed cause the one or more processors to deploy the updated scan results to remote clients executing additional clone images and connected to the local client device across a network.

In Example 9, the Example of claim 6 can optionally include the clone image comprises a read-only layer and a cache snapshot layer, wherein the read-only layer comprises the instance of the operating system and the application, and wherein the cache snapshot layer includes the copy of the scan results.

In Example 10, the Example of claim 9 can optionally include the clone image further comprises a copy-on-write layer configured to store modifications to the clone image by a local client device.

Example 11 includes a method for utilizing a virtual desktop infrastructure, comprising: receiving, from a server, a clone image comprising an instance of an operating system and an application hosted by the server, and a copy of scan results; identifying initiation of the application using the clone image; in response to identifying initiation of the application, determining that the copy of scan results includes scan results of the application; and in response to determining the copy of scan results includes scan results of the application, executing the application without any further scan of the application.

In Example 12, the Example of claim 11 can optionally include determining that the copy of the scan results has expired; and in response to determining that the copy of the scan results have expired: scanning the application, and updating the scan results to obtain updated scan results.

In Example 13, the Example of claim 12 may optionally include deploying the updated scan results to clients executing additional clone images and connected to the machine across a network.

In Example 14, the Example of claim 11 may optionally include wherein the clone image comprises a read-only layer and a cache snapshot layer, wherein the read-only layer comprises the instance of the operating system and the application, and wherein the cache snapshot layer includes the copy of the scan results.

In Example 15, the Example of claim 14 can optionally include wherein the clone image further comprises a copy-on-write layer configured to store modifications to the clone image by a local client device.

Example 16 includes a machine readable medium on which instructions are stored, comprising instructions that when executed cause a machine to: generate a base image comprising a first instance of an operating system and a first instance of an application hosted by a server; perform a scan on the base image to obtain scan results; generate the clone image to include a second instance of the operating system, a second instance of the application, and a copy of the scan results; and deploy the clone image to the client, wherein the clone image is configured to allow the client to execute the clone image without scanning the clone image.

In Example 17, the Example of claim 16 can optionally include instructions that when executed cause the machine to: determine that the scan results have expired; and in response to determining that the scan results have expired: scan the application, update the scan results to obtain updated scan results, and deploy the updated scan results to the client.

In Example 18, the Example of claim 17 can optionally include wherein the instructions that when executed cause the machine to deploy the updated scan results to the client comprise instructions that when executed cause the machine to deploy, to the client, an updated clone image comprising the updated scan results.

In Example 19, the Example of claim 16 can optionally include wherein the clone image comprises a read-only layer and a cache snapshot layer, wherein the read-only layer comprises the first instance of the operating system and the application, and wherein the cache snapshot layer includes the copy of the scan results.

In Example 20, the Example of claim 19 can optionally include wherein the clone image further comprises a copy-on-write layer configured to store modifications to the clone image by a local client device.

Example 21 includes a method for providing a virtual desktop infrastructure, the method comprising: generating a base image comprising a first instance of an operating system and a first instance of an application hosted by a server; performing a scan on the base image to obtain scan results; generating the clone image to include a second instance of the operating system, a second instance of the application, and a copy of the scan results; and deploying the clone image to the client, wherein the clone image is configured to allow the client to execute the clone image without scanning the clone image.

In Example 22, the Example of claim 21 can optionally include determining that the scan results have expired; and in response to determining that the scan results have expired: scanning the application, updating the scan results to obtain updated scan results, and deploying the updated scan results to the client.

In Example 23, the Example of claim 22 can optionally include wherein deploying the updated scan results to the client comprises deploying, to the client, an updated clone image comprising the updated scan results.

In Example 24, the Example of 21 can optionally include wherein the clone image comprises a read-only layer and a cache snapshot layer, wherein the read-only layer comprises the first instance of the operating system and the application, and wherein the cache snapshot layer includes the copy of the scan results.

In Example 25, the Example of 24 can optionally include wherein the clone image further comprises a copy-on-write layer configured to store modifications to the clone image by a local client device.

Example 26 includes a machine readable medium including code, when executed, to cause a machine to perform the methods of Examples 11-15.

Example 27 includes machine readable medium including code, when executed, to cause a machine to perform the methods of Examples 21-25.

Example 28 includes a network device, comprising: means for generating a base image comprising a first instance of an operating system and a first instance of an application hosted by a server; means for performing a scan on the base image to obtain scan results; means for generating the clone image to include a second instance of the operating system, a second instance of the application, and a copy of the scan results; and means for deploying the clone image to the client, wherein the clone image is configured to allow the client to execute the clone image without scanning the clone image.

In Example 29, the Example of 28 can optionally include means for determining that the copy of the scan results has expired; and means for, in response to determining that the copy of the scan results have expired: scanning the application, and updating the scan results to obtain updated scan results.

Example 30 includes a network device, comprising: means for generating a base image comprising a first instance of an operating system and a first instance of an application hosted by a server; means for performing a scan on the base image to obtain scan results; means for generating the clone image to include a second instance of the operating system, a second instance of the application, and a copy of the scan results; and means for deploying the clone image to the client, wherein the clone image is configured to allow the client to execute the clone image without scanning the clone image.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. A non-transitory machine readable medium on which instructions are stored for expediting execution of a clone image on a host client, comprising instructions that when executed cause a machine to:
   receive, from a server, a clone image comprising an instance of an operating system and an application hosted by the server, and a copy of scan results;
   identify initiation of the application using the clone image on a client device;
   in response to identifying initiation of the application, determine that the copy of scan results includes scan results of the application; and
   in response to determining the copy of scan results includes scan results of the application, execute the application on the client device based on the scan results without any further scan of the application, wherein the clone image comprises a read-only layer and a cache snapshot layer, wherein the read-only layer comprises the instance of the operating system and the application, and wherein the cache snapshot layer includes the copy of the scan results.

2. The non-transitory machine readable medium of claim 1, further comprising instructions that when executed cause the machine to:
   determine that the copy of the scan results has expired; and
   in response to determining that the copy of the scan results have expired:
scan the application, and update the scan results to obtain updated scan results.

3. The non-transitory machine readable medium of claim 2, further comprising instructions that when executed cause the machine to:
deploy the updated scan results to clients executing additional clone images and connected to the machine across a network.

4. The non-transitory machine readable medium of claim 1, wherein the clone image further comprises a copy-on-write layer configured to store modifications to the clone image by a local client device.

5. A system for expediting execution of a clone image on a host client, comprising:
one or more processors; and
a memory, coupled to the one or more processors, on which instructions are stored comprising instructions which, when executed by the one or more processors cause the one or more processors to:
receive, from a server, a clone image comprising an instance of an operating system and an application hosted by the server, and a copy of scan results;
identify initiation of the application using the clone image on a client device;
in response to identifying initiation of the application, determine that the copy of scan results includes scan results of the application; and
in response to determining the copy of scan results includes scan results of the application, execute the application on the client device based on the scan results without any further scan of the application, wherein the clone image comprises a read-only layer and a cache snapshot layer, wherein the read-only layer comprises the instance of the operating system and the application, and wherein the cache snapshot layer includes the copy of the scan results.

6. The system of claim 5, the instructions further comprising instructions that when executed cause the one or more processors to:
determine that the copy of the scan results has expired; and
in response to determining that the copy of the scan results has expired:
scan the application, and update the scan results to obtain updated scan results.

7. The system of claim 6, the instructions further comprising instructions that when executed cause the one or more processors to:
deploy the updated scan results to other clients executing additional clone images.

8. The system of claim 5, wherein the clone image further comprises a copy-on-write layer configured to store modifications to the clone image by a local client device.

9. A method for expediting execution of a clone image on a host client, comprising:
receiving, from a server, a clone image comprising an instance of an operating system and an application hosted by the server, and a copy of scan results;
identifying initiation of the application using the clone image on a client device;
in response to identifying initiation of the application, determining that the copy of scan results includes scan results of the application; and
in response to determining the copy of scan results includes scan results of the application, executing the application on the client device based on the scan results without any further scan of the application, wherein the clone image comprises a read-only layer and a cache snapshot layer, wherein the read-only layer comprises the instance of the operating system and the application, and wherein the cache snapshot layer includes the copy of the scan results.

10. The method of claim 9, further comprising:
determining that the copy of the scan results has expired; and
in response to determining that the copy of the scan results has expired:
scanning the application, and updating the scan results to obtain updated scan results.

11. The method of claim 10, further comprising:
deploying the updated scan results to other clients executing additional clone images.

12. The method of claim 9, wherein the clone image further comprises a copy-on-write layer configured to store modifications to the clone image by a local client device.

13. A non-transitory machine readable medium on which instructions are stored, comprising instructions that when executed cause a machine to:
generate a base image comprising a first instance of an operating system and a first instance of an application hosted by a server;
perform a scan on the base image to obtain scan results;
generate a clone image to include a second instance of the operating system, a second instance of the application, and a copy of the scan results; and
deploy the clone image to a client,
wherein the clone image is configured to allow the client to execute the clone image based on the copy of the scan results without scanning the clone image, wherein the clone image comprises a read-only layer and a cache snapshot layer, wherein the read-only layer comprises the first instance of the operating system and the application, and wherein the cache snapshot layer includes the copy of the scan results.

14. The non-transitory machine readable medium of claim 13, further comprising instructions that when executed cause the machine to:
determine that the scan results have expired; and
in response to determining that the scan results have expired:
scan the application, update the scan results to obtain updated scan results, and deploy the updated scan results to the client.

15. The non-transitory machine readable medium of claim 14, wherein the instructions that when executed cause the machine to deploy the updated scan results to the client comprise instructions that when executed cause the machine to deploy, to the client, an updated clone image comprising the updated scan results.

16. The non-transitory machine readable medium of claim 13, wherein the clone image further comprises a copy-on-write layer configured to store modifications to the clone image by a local client device.

17. A method for providing a virtual desktop infrastructure, the method comprising:
generating a base image comprising a first instance of an operating system and a first instance of an application hosted by a server;
performing a scan on the base image to obtain scan results;
generating a clone image to include a second instance of the operating system, a second instance of the application, and a copy of the scan results; and
deploying the clone image to a client,
wherein the clone image is configured to allow the client to execute the clone image based on the copy of the scan results without scanning the clone image, wherein the clone image comprises a read-only layer and a cache snapshot layer, wherein the read-only layer comprises the first instance of the operating system and the application, and wherein the cache snapshot layer includes the copy of the scan results.

18. The method of claim 17, further comprising:
determining that the scan results have expired; and
in response to determining that the scan results have expired:
scanning the application, updating the scan results to obtain updated scan results, and deploying the updated scan results to the client.

19. The method of claim 18, wherein deploying the updated scan results to the client comprises deploying, to the client, an updated clone image comprising the updated scan results.

20. The method of claim 17, wherein the clone image further comprises a copy-on-write layer configured to store modifications to the clone image by a local client device.

* * * * *